3,723,226
DEVICE FOR PICKING UP SECTIONS
FROM A MICROTOME
Wolfgang Pfohler, Lauda, Germany, assignor to
Ernst Leitz GmbH, Wetzlar, Germany
Filed June 4, 1971, Ser. No. 149,917
Claims priority, application Germany, June 12, 1970,
P 20 28 898.6
Int. Cl. B26d 4/46; B65f 35/18
U.S. Cl. 156—556                                9 Claims

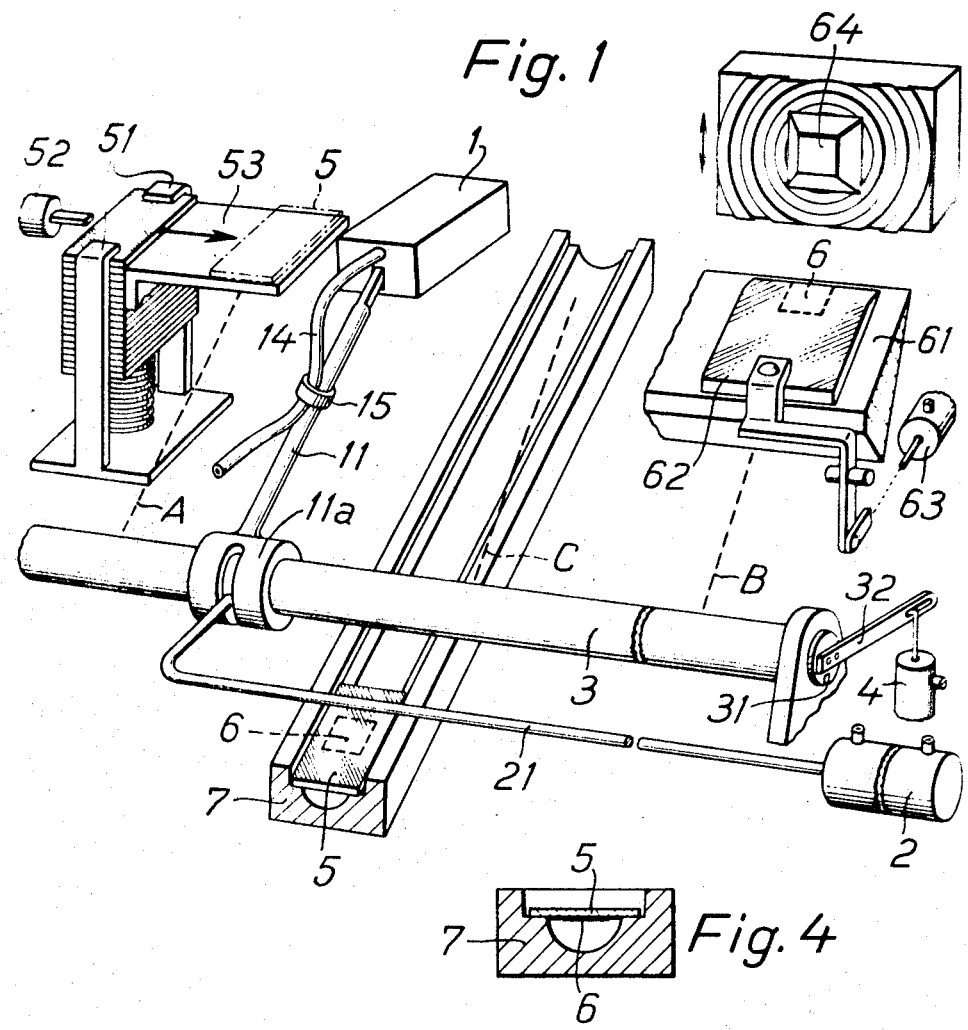
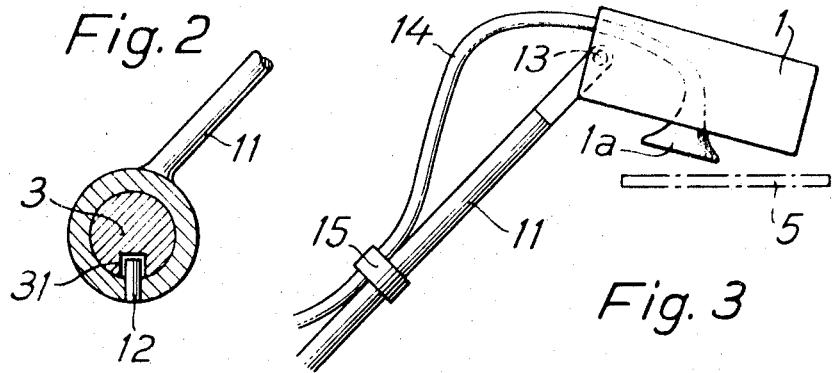

ABSTRACT OF THE DISCLOSURE

A device for picking up sections from the blade of a microtome, in particular frozen sections, comprises gripper means for automatically lifting slides from a slide depot, for moving the slides to the blade, bringing the slide into contact with the section, and transporting slide and section to a guide rail where the slide is released. The gripper means is pivotable about a shaft and laterally displaceable thereon. Mechanical elements are provided for controlling the movements of the means in the required order.

BACKGROUND OF THE INVENTION

The present invention relates to a device for picking up sections from the blade of a microtome; more particularly for picking up frozen sections.

Devices for removing sections from a microtome blade are already known. However, such known devices are not suitable for picking frozen sections from the blade, especially when the microtome is installed in a refrigerated cabinet. Frozen sections are, therefore, usually taken off the blade by hand and placed on a slide. This requires considerable skill even if the microtome stands in a room having normal temperature. In case the microtome is located in a refrigerated cabinet additional difficulties are encountered which may, for example, be presented by a hole through the cabinet wall which must be protected against the admittance of warm air into the cabinet. If the cabinet is actually a larger room an operator cannot be expected to work in there for a longer period of time.

It is therefore the object of the invention to provide a mechanical device for picking up the frozen section from the microtome blade and it is a further object to control the device according to a pre-set program so that the picking-up will be accomplished automatically.

SUMMARY OF THE INVENTION

The above stated objects are attained by providing a gripper means which can be moved along and can be pivoted about a stationary axis by expedient driving means so as to occupy three different positions. One driving means accomplishes the lateral displacement of the gripper means and another driving means tilts the gripper means about an appropriate angle. In the first position the gripper means takes up a slide from a slide depot; in the second position the section is picked from the microtome blade and in the third position the slide with the section is transported above a guide rail where the slide is released for sliding down the rail. The slides may be manually placed in a position for being taken up by the gripper, but this can also be done automatically.

Basically, the gripper need only be inclined by a fixed angle if all pick-up and deposit positions are inclined by the same angle. Since, however, the inclination of the microtome blade must be varied in dependence on the specimen to be sliced it proves necessary to connect the gripper to the carrier arm by a hinge connection. Resilient means are provided to keep the gripper in a certain inclined position from where it may be adjusted to various lesser angles.

In instances where the microtome blade is used in connection with an anti-roll plate the latter must be moved out of the path of the gripper prior to tilting the gripper down on the blade. This movement may be accomplished by an additional driving means which may be controlled by the same elements which control the movement of the gripper means. The driving force of the gripper means may preferably be a pneumatic or an electromotive force.

BRIEF DESCRIPTION OF THE DRAWINGS

The invention will be more readily comprehended from the following description when taken in conjunction with the appending drawings, wherein:

FIG. 1 is a perspective view of the gripper means in connection with the slide depot, the microtome blade and the guide rail, FIG. 2 is a cross-section view of the shaft supporting the gripper means, FIG. 3 is a view of the front portion of the gripper, FIG. 4 shows a cross-section of the guide rail with slide and section.

DESCRIPTION OF THE PREFERRED EMBODIMENT

Referring now to the drawings it is emphasized that in the preferred embodiment illustrated in the FIGS. 1 through 4 the gripper means is a pneumatically operated suction device.

On a shaft 3 a carrier arm 11 is laterally slidable and tiltable by means of a sleeve 11a. For moving the carrier arm 11 along on the shaft 3 a drive mechanism 2 is provided which is connected to the sleeve 11a through a connection rod 21. The latter has a bent-over end portion which engages the sleeve 11a in an oblong recess in the sleeve wall. The sleeve 11a is further provided with a pin 12 (FIG. 2) which projects into a groove 31 extending along the shaft 3 in parallel to the shaft axis. The shaft 3 is pivotably supported. At its right-hand side (FIG. 1) an arm 32 is positively secured to the face of the shaft. The front end of the arm has an oblong hole which is engaged by a push rod actuated by a drive mechanism. The latter is used for pivoting the shaft 3, thereby tilting the carrier arm 11 and the take-up block at the front end of the arm.

As indicated by the dotted lines A, B and C the carrier arm 11 with the take-up block is to be moved to three specific positions. In position A the take-up block is in alignment with the pick-up tray 53 on which slides 5 are placed from a slide depot 51 by means of a transporting mechanism 52. In position B the take-up block 1 is above the microtome blade 61 from where the sections are to be picked up. And, finally, in position C the slide with the section will be dropped on a guide rail 7. The take-up block 1 is connected to the carrier arm 11 by a hinge joint 13 and is under the resilient force of the tube 14 which is fastened to the carrier arm 11 by means of a clip 15. However, the resilient force may also be generated by additional spring means.

As will be readily comprehended, particularly from the FIGS. 2 and 3, the tube 14 ends in a mouthpiece 1a on the side of the take-up block which faces the slide. This mouthpiece 1a contacts the slides when the carrier arm 11 is tilted in a downward direction.

The described device operates in the following manner: First, the transporting mechanism 52 pushes the topmost slide from the slide depot 51 on the pick-up tray 53. Then, the drive mechanism 2 moves the sleeve 11a, together with the carrier arm 11 and the take-up block 1, to position A, where the drive mechanism 4 lowers the carrier arm until the mouthpiece 1a touches the slide 5. A suction pump (not shown) is now put into operation and causes the slide 5 to stick to the mouthpiece. Again, by means of the two drive mechanisms 2 and 4, the carrier arm and the take-up block are now moved to position B and let down on the blade 61 with the frozen section 6. The section has previously been cut by moving the specimen 64 past the blade edge. Simultaneously with moving the take-up block from position A to position B a drive mechanism 63 is actuated which removes an anti-roll plate 62 from the blade.

The take-up block remains in position B long enough for the frozen section to adhere safely to the slide. Thereafter, the take-up block is moved to position C and there it is tilted downwards until the slide 5 rests just above the guide rail 7. Then the suction pump is switched off which causes the slide to fall down on the guide rail.

As illustrated in FIG. 4, the guide rail 7 has the form of a semicircular channel with a shoulder on either side whereon the slide glides. Damages to the section adhering to the slide are avoided by providing a channel in the guide rail. The guide rail is inclined in the direction of the shaft 3 so that the slide glides down to the end of the rail where it can be taken off conveniently. In case the microtome is mounted inside a refrigerated cabinet the guiderail may extend through the cabinet wall so that the operator can take off the slide without getting into touch with the cold cabinet.

The various drive mechanisms described above may be of different types. They may, for example, be pneumatic, hydraulic, or electromotive drives.

In order to accelerate the speed with which the section adheres to the slide, it may prove advantageous to increase the difference in temperature between the slide and the frozen section. To this end, a heating stage may be employed as the pick-up tray 53.

What is claimed is:

1. A device for picking up a section from a microtome blade, placing it on a slide and transporting slide and section to a place of deposit, the device comprising
   (a) a carrier arm which is movable to anyone of three different positions along a rectilinear path and which is tiltable in each of the three positions about one end of the arm;
   (b) gripper means attached to the other end of the carrier arm for taking up and transporting a slide;
   (c) first drive means connected to the carrier arm for laterally displacing the arm and the attached gripper means; and
   (d) second drive means in operative connection with the carrier arm for tilting the arm and the attached gripper means; in the first position a slide is taken up by the gripper means, in the second position the slide supported by the gripper means is tilted until the slide contacts the section to be picked up which adheres to the slide, and in the third position the slide with the adhering section is released from the gripper means.

2. A device for picking up a section from a microtome blade as claimed in claim 1, wherein the gripper means is a suction device comprising a tube and a mouthpiece which in the first position is pressed against the slide.

3. A device for picking up a section from a microtome blade as claimed in claim 2, wherein the mouthpiece is connected to the carrier arm by means of a hinge and is under the influence of a resilient force.

4. A device for picking up a section from a microtome blade as claimed in claim 1, and further comprising a slide depot wherein slides are stored, a pick-up tray adjacent the slide depot from where a slide is picked up by the gripper means, and a transport mechanism for transporting slides successively from the depot to the tray.

5. A device for picking up a section from a microtome blade as claimed in claim 4, wherein the pick-up tray is a heating stage.

6. A device for picking up a section from a microtome blade as claimed in claim 1, and further comprising an anti-roll plate on the microtome blade and a drive mechanism for removing the anti-roll plate prior to tilting the gripper-supported slide into contact with the section.

7. A device for picking up a section from a microtome blade as claimed in claim 1, wherein the drive mechanisms are pneumatically operated.

8. A device for picking up a section from a microtome blade as claimed in claim 1, wherein the place of deposit is a semicircular channel being provided with shoulders along either side.

9. A device for picking up a section from a microtome blade as claimed in claim 8, wherein the channel is mounted in an inclined position so that the deposited slides glide downwards for a convenient take-off.

References Cited

UNITED STATES PATENTS

| 3,191,476 | 6/1965 | McCormick | 83—915.5 |
| 3,272,348 | 9/1966 | Metz | 83—915.5 |
| 3,293,966 | 12/1966 | McCormick et al. | 83—915.5 |
| 3,480,504 | 11/1969 | Good et al. | 156—556 |
| 3,552,247 | 1/1971 | Pickett | 83—915.5 |

ALFRED L. LEAVITT, Primary Examiner

J. H. NEWSOME, Assistant Examiner

U.S. Cl. X.R.

83—112, 165, 915.5; 156—512, 516, 566